United States Patent
Inoue et al.

(10) Patent No.: US 10,906,481 B2
(45) Date of Patent: Feb. 2, 2021

(54) PROTECTOR

(71) Applicants: TOYOTA JIDOSHA KABUSHIKI KAISHA, Toyota (JP); Yazaki Corporation, Minato-ku (JP)

(72) Inventors: Kouichi Inoue, Okazaki (JP); Takahiro Kitagawa, Toyota (JP); Kunihito Ogura, Toyota (JP)

(73) Assignees: TOYOTA JIDOSHA KABUSHIKI KAISHA, Toyota (JP); Yazaki Corporation, Minato-ku (JP)

( * ) Notice: Subject to any disclaimer, the term of this patent is extended or adjusted under 35 U.S.C. 154(b) by 0 days.

(21) Appl. No.: 16/291,135

(22) Filed: Mar. 4, 2019

(65) Prior Publication Data

US 2019/0275965 A1 Sep. 12, 2019

(30) Foreign Application Priority Data

Mar. 12, 2018 (JP) .................................. 2018-044220

(51) Int. Cl.
*B60R 16/02* (2006.01)
*H02G 3/04* (2006.01)
*H02G 3/06* (2006.01)

(52) U.S. Cl.
CPC ....... *B60R 16/0215* (2013.01); *H02G 3/0418* (2013.01); *H02G 3/0691* (2013.01)

(58) Field of Classification Search
CPC ........... H02G 15/04; B60R 16/02; H01R 4/22
See application file for complete search history.

(56) References Cited

U.S. PATENT DOCUMENTS

| | | | | |
|---|---|---|---|---|
| 2,309,719 A | * | 2/1943 | Vaill | F16L 33/26 285/222.5 |
| 3,711,633 A | * | 1/1973 | Ghirardi | H02G 15/18 174/135 |
| 4,376,548 A | * | 3/1983 | Armstrong | F16L 33/24 285/222.1 |
| 4,729,583 A | * | 3/1988 | Lalikos | F16L 33/01 285/222.1 |
| 4,735,581 A | * | 4/1988 | Endo | H01R 13/5205 439/279 |
| 4,797,512 A | * | 1/1989 | Kumagai | H02G 15/18 174/135 |
| 4,895,533 A | * | 1/1990 | Yagi | H01R 13/5205 439/278 |

(Continued)

FOREIGN PATENT DOCUMENTS

| | | |
|---|---|---|
| JP | 2016-19406 A | 2/2016 |
| JP | 2016158329 A * | 9/2016 |
| JP | 2017-123754 | 7/2017 |

*Primary Examiner* — Binh B Tran
*Assistant Examiner* — Krystal Robinson
(74) *Attorney, Agent, or Firm* — Oblon, McClelland, Maier & Neustadt, L.L.P.

(57) ABSTRACT

A protector includes a case configured to accommodate a wire harness, wherein the case is provided with an insertion hole configured such that the wire harness is inserted through the insertion hole, a rib is provided on an inner surface of the case, the inner surface defining the insertion hole, and the rib protruding inwardly from the inner surface, and the rib is configured to: be fitted in a groove portion provided in an outer peripheral surface of a corrugated tube that is externally mounted on the wire harness; and hold a plug configured to close the insertion hole.

7 Claims, 3 Drawing Sheets

(56) References Cited

U.S. PATENT DOCUMENTS

| | | | | | |
|---|---|---|---|---|---|
| 5,105,054 | A * | 4/1992 | Kirma | ............... | H01R 13/6592 174/2 |
| 5,277,459 | A * | 1/1994 | Braun | .................... | H02G 3/06 174/92 |
| 5,295,865 | A * | 3/1994 | Endo | .................... | H01R 43/005 439/271 |
| 5,564,716 | A * | 10/1996 | Onoue | ............... | H01R 13/5205 277/607 |
| 5,571,030 | A * | 11/1996 | Gladd | ................ | H01R 13/4367 439/188 |
| 5,586,916 | A * | 12/1996 | Shinji | .................. | H01R 13/501 439/448 |
| 5,660,566 | A * | 8/1997 | Ohsumi | ............ | H01R 13/5205 439/275 |
| 6,568,967 | B2 * | 5/2003 | Inaba | .................. | H01R 13/501 439/701 |
| 6,619,697 | B2 * | 9/2003 | Griffioen | ............... | F16L 41/023 285/126.1 |
| 6,830,225 | B2 * | 12/2004 | Kato | .................... | H02G 3/0487 248/49 |
| 7,328,920 | B2 * | 2/2008 | Schneider | ........... | F16L 25/0036 285/256 |
| 7,597,117 | B1 * | 10/2009 | Groso | ................ | F16L 55/1108 138/89 |
| 8,128,126 | B2 * | 3/2012 | Poupore | .................. | F16L 21/06 285/131.1 |
| 8,985,533 | B2 * | 3/2015 | Edmond | ................ | F16L 3/1222 248/68.1 |
| 9,257,822 | B2 * | 2/2016 | Kitamura | ............. | H02G 3/0691 |
| 9,515,472 | B2 * | 12/2016 | Muehlmichel | ....... | H02G 15/013 |
| 9,566,740 | B2 * | 2/2017 | Valola | .................... | B29C 53/08 |
| 9,963,092 | B2 * | 5/2018 | Uno | .................... | B60R 16/0215 |
| 10,312,630 | B1 * | 6/2019 | Advey | ................ | H01R 13/5205 |
| 2002/0000499 | A1 * | 1/2002 | Aoki | .................... | B60R 16/0215 248/74.4 |
| 2002/0151213 | A1 * | 10/2002 | Aoki | .................... | B60R 16/0215 439/502 |
| 2003/0183413 | A1 * | 10/2003 | Kato | ........................ | H02G 3/32 174/135 |
| 2003/0222183 | A1 * | 12/2003 | Kato | .................... | H02G 3/0487 248/49 |
| 2004/0080119 | A1 * | 4/2004 | Goll | .................... | H02G 15/013 277/607 |
| 2005/0029005 | A1 * | 2/2005 | Arai | ........................ | H02G 3/30 174/72 A |
| 2005/0217888 | A1 * | 10/2005 | Arai | .................... | H02G 3/0418 174/72 A |
| 2006/0090916 | A1 * | 5/2006 | Suzuki | ................. | H02G 3/0691 174/481 |
| 2009/0050350 | A1 * | 2/2009 | Katsumata | ........... | H02G 3/0691 174/135 |
| 2009/0084578 | A1 * | 4/2009 | Irisawa | ............... | B60R 16/0215 174/135 |
| 2010/0059941 | A1 * | 3/2010 | Beele | ........................ | F16L 5/10 277/606 |
| 2010/0181728 | A1 * | 7/2010 | Thompson | ............... | H02G 3/22 277/314 |
| 2010/0240238 | A1 * | 9/2010 | Hattori | ............... | H01R 13/5213 439/135 |
| 2011/0006513 | A1 * | 1/2011 | Lechner | .................... | F16L 53/38 285/122.1 |
| 2011/0127084 | A1 * | 6/2011 | Ichikawa | ............ | B60R 16/0215 174/72 A |
| 2013/0269970 | A1 * | 10/2013 | Hara | ........................ | H02G 3/04 174/101 |
| 2015/0000974 | A1 * | 1/2015 | Shiga | .................... | H02G 3/0481 174/72 A |
| 2018/0233887 | A1 * | 8/2018 | Suzuki | .................... | H02G 3/04 |

\* cited by examiner

PROTECTOR

INCORPORATION BY REFERENCE

The disclosure of Japanese Patent Application No. 2018-044220 filed on Mar. 12, 2018 including the specification, drawings and abstract is incorporated herein by reference in its entirety.

BACKGROUND

1. Technical Field

The disclosure relates to a protector.

2. Description of Related Art

As related art, a protector configured to protect a wire harness to be routed in a vehicle has been known (refer to, for example, Japanese Unexamined Patent Application Publication No. 2017-123754 (JP 2017-123754 A)).

The protector includes a case configured to accommodate the wire harness, and the case is provided with a plurality of insertion holes through which the wire harness is to be inserted. Lid members configured to open or close the insertion holes are attached to the case via hinges, and the case is provided with locking portions configured to hold the lid members in an open state or a closed state. The lid member for an insertion hole in which the wire harness is to be disposed is held in the open state by the locking portion, and the lid member for an insertion hole in which the wire harness is not to be disposed is held in the closed state by the locking portion. Thus, when there is an insertion hole in which the wire harness is not to be disposed due to, for example, vehicle specifications, the insertion hole is closed by the lid member. As a result, the entry of foreign matter into the case can be reduced.

SUMMARY

The protector described above reduces the entry of foreign matter into the case. However, the case is provided with the locking portions disposed near the insertion holes. This leads to an increase in the size of the case.

The disclosure provides a protector configured to reduce the entry of foreign matter into a case while restraining an increase in the size of the case.

A protector according to a first aspect of the disclosure includes: a case configured to accommodate a wire harness, wherein the case is provided with an insertion hole configured such that the wire harness is inserted through the insertion hole, a rib is provided on an inner surface of the case, the inner surface defining the insertion hole, and the rib protruding inwardly from the inner surface, and the rib is configured to: be fitted in a groove portion provided in an outer peripheral surface of a corrugated tube that is externally mounted on the wire harness; and hold a plug configured to close the insertion hole.

According to the foregoing aspect, the plug is disposed in the insertion hole in which the wire harness is not disposed. That is, when there is an insertion hole in which the wire harness is not disposed due to, for example, vehicle specifications, the insertion hole is closed by the plug. Thus, the entry of foreign matter into the case can be reduced. Further, the plug is installed with the use of the rib for fixing the corrugated tube. Thus, an increase in the size of the case is restrained, as compared with a case in which the locking portions for holding the lid members in the open state or the closed state are provided.

With the protector according to the disclosure, it is possible to restrain an increase in the size of the case while reducing the entry of foreign matter into the case.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the accompanying drawings.

First, a protector 100 according to an embodiment of the disclosure will be described with reference to FIG. 1 to FIG. 4.

Figure 1:
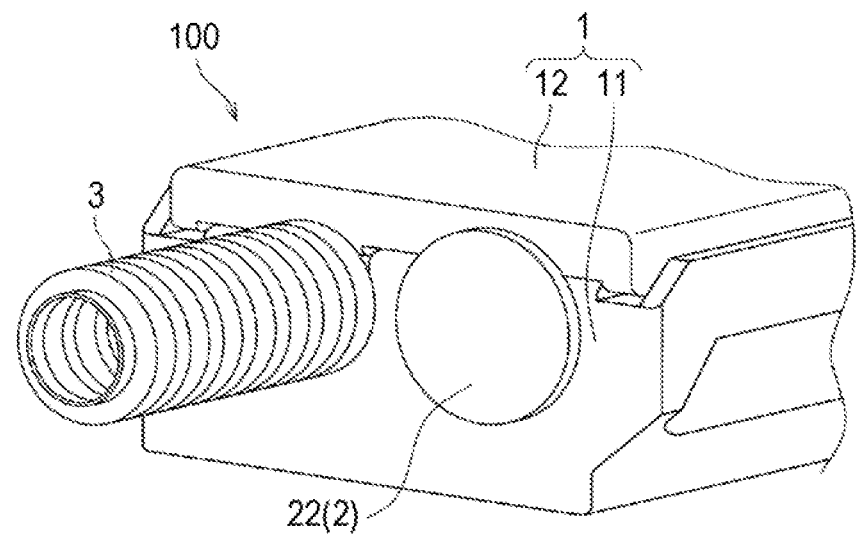
FIG. 1 is a perspective view illustrating a protector according to an embodiment.

The protector 100 is configured to protect a wire harness to be routed in a vehicle (not illustrated). The protector 100 is fixed to, for example, a body of the vehicle, and has a function of defining a routing position of the wire harness. As illustrated in FIG. 1, the protector 100 includes a case 1 in which a wire harness (not illustrated) is accommodated, and a plug 2 to be described later.

Figure 2:
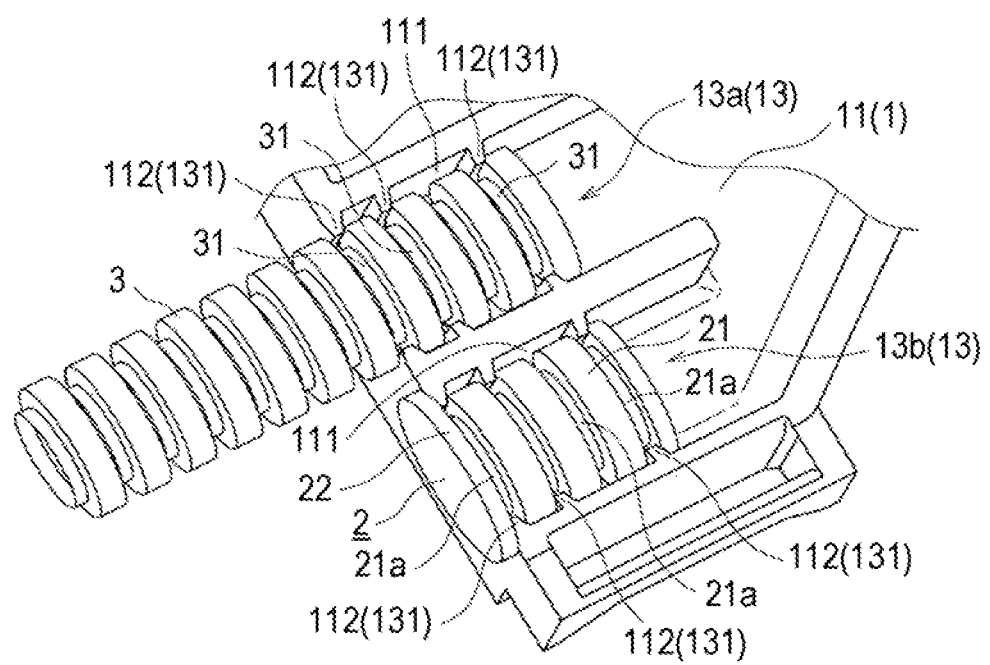
FIG. 2 is a perspective view illustrating a state where a cover of the protector in FIG. 1 is removed.

The case 1 includes a case body 11 and a cover 12. The case body 11 is in the form of a box having an open upper end. The cover 12 is attached to the case body 11 so as to cover the upper end of the case body 11. As illustrated in FIG. 2, the case 1 is provided with a plurality of insertion holes 13 through which the wire harness is to be inserted. The insertion holes 13 are provided in order to draw the wire harness out of the case 1.

The wire harness is provided in order to supply electric power or transmit signals. A corrugated tube 3, which is a protective tube, is externally mounted on at least a portion of the wire harness, which is to be inserted through the insertion hole 13. The corrugated tube 3 is configured to cover an outer periphery of the wire harness, and has a bellows shape. That is, the corrugated tube 3 is provided with a plurality of groove portions 31 having an annular shape and extending in the circumferential direction of the corrugated tube 3, and the groove portions 31 are arranged at intervals in the extending direction of the corrugated tube 3.

Each insertion hole 13 is defined by a U-shaped portion 111 of the case body 11 and the cover 12, and an open end thereof is provided in a side surface of the case 1. An inner surface of the case 1, which defines the insertion hole 13, is provided with a plurality of ribs 131 (refer to FIG. 4) protruding inward from the inner surface. Each rib 131 includes an arc-shaped protrusion 112 of the case body 11 and an arc-shaped protrusion (not illustrated) of the cover 12, and has an annular shape. The ribs 131 are provided at intervals in the extending direction of the wire harness. The ribs 131 are configured to be fitted in the groove portions 31 of the corrugated tube 3 when the wire harness and the corrugated tube 3 are disposed in the insertion hole 13. Thus, when the wire harness and the corrugated tube 3 are disposed in the insertion hole 13, the corrugated tube 3 is engaged with the ribs 131, so that the corrugated tube 3 is fixed to the case 1.

In the present embodiment, the wire harness and the corrugated tube 3 are disposed in a first insertion hole 13a included in the plurality of insertion holes 13, and neither the wire harness nor the corrugated tube 3 is disposed in a second insertion hole 13b included in the plurality of insertion holes 13. Whether there is the second insertion hole 13b in which neither the wire harness nor the corrugated tube 3 is disposed as described above is determined based on for example, vehicle specifications. A plug 2 configured to close the second insertion hole 13b is fitted in the second insertion hole 13b by the ribs 131. The second insertion hole 13b as well as the first insertion hole 13a is provided such that the wire harness and the corrugated tube 3 can be disposed therein.

Figure 3:
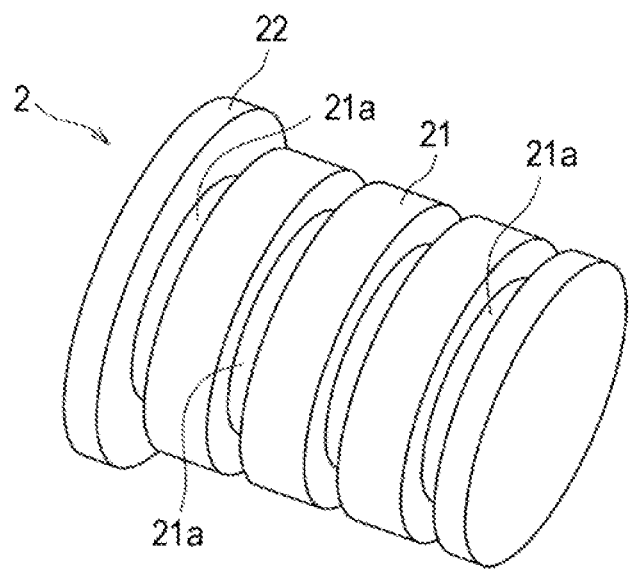
FIG. 3 is a perspective view illustrating a plug of the protector in FIG. 1.
Figure 4:
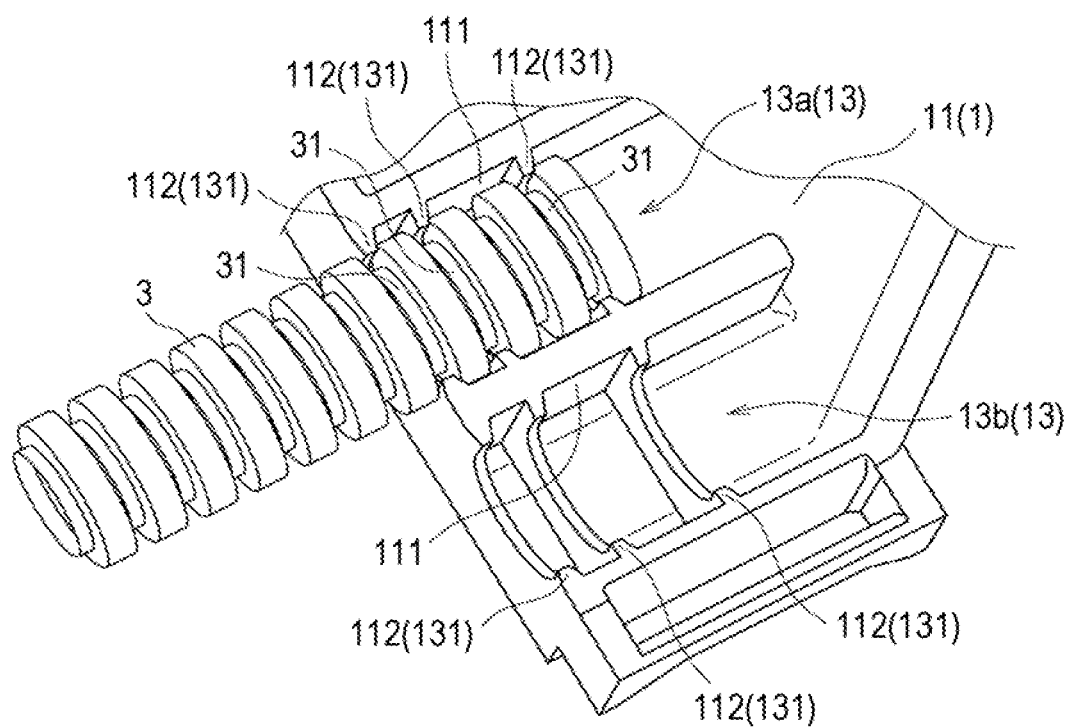
FIG. 4 is a perspective view illustrating a state where the plug of the protector in FIG. 2 is removed.

The plug 2 is provided in order to reduce the entry of foreign matter into the case 1. As illustrated in FIG. 3, the plug 2 includes a body portion 21 having a columnar shape, and the body portion 21 is disposed in the second insertion hole 13b. An outer peripheral surface of the body portion 21 is provided with a plurality of groove portions 21a having an annular shape and extending in the circumferential direction of the plug 2, and the groove portions 21a are arranged at intervals in the axial direction of the plug 2. The diameter of the body portion 21 is greater than the inner diameter of each rib 131, and the diameter of each groove portion 21a is less than the inner diameter of each rib 131. When the body portion 21 is disposed in the second insertion hole 13b, the ribs 131 are fitted in the groove portions 21a of the plug 2. Thus, the plug 2 is engaged with the ribs 131, so that the plug 2 is fixed to the case 1. That is, the plug 2 is configured not to come out of the second insertion hole 13b. That is, the plug 2 is fixed to the case 1 with the use of the ribs 131 that are provided for fixing the corrugated tube 3.

The plug 2 includes a flange 22 provided at one end of the body portion 21. The flange 22 is disposed along the side surface of the case 1. The diameter of the flange 22 is greater than the diameter of the body portion 21. Therefore, when the protector 100 is seen in the axial direction of the plug 2, the second insertion hole 13b is completely covered with the flange 22.

Advantageous Effects

In the present embodiment, the plug 2 is fitted in the second insertion hole 13b in which neither the wire harness nor the corrugated tube 3 is disposed, as described above. Thus, when there is the second insertion hole 13b in which the wire harness is not disposed due to, for example, the vehicle specifications, the second insertion hole 13b is closed by the plug 2. Thus, the entry of foreign matter into the case 1 can be reduced. As a result, it is possible to reduce the wear of the wire harness due to the entry of foreign matter into the case 1. The plug 2 is installed with the use of the ribs 131 for fixing the corrugated tube 3. Thus, an increase in the size of the case 1 is restrained, as compared with the related art in which the locking portions for holding the lid members in the open state or the closed state are provided. As a result, the protector 100 is restrained from coming into contact with peripheral components (not illustrated). Although the flange 22 is disposed along the side surface of the case 1, the space in which the flange 22 is disposed is a space in which the wire harness is to be disposed depending on the vehicle specifications. Thus, the flange 22 is less likely to come into contact with peripheral components.

In the present embodiment, the body portion 21 of the plug 2 is disposed in the second insertion hole 13b. Thus, for example, when an external force is locally applied to the case 1, the case 1 is supported by the plug 2 (a load locally input into the case 1 is transmitted to another portion of the case 1 by the plug 2). As a result, damages to the case 1 can be reduced.

Other Embodiments

The foregoing embodiment is an example in all respects and is not a basis for a limited interpretation. Therefore, the technical scope of the disclosure is not to be interpreted only according to the embodiment but is defined based on the description of the claims. Also, the technical scope of the disclosure covers various modifications and equivalent arrangements within the scope of the claims.

Figure 5:
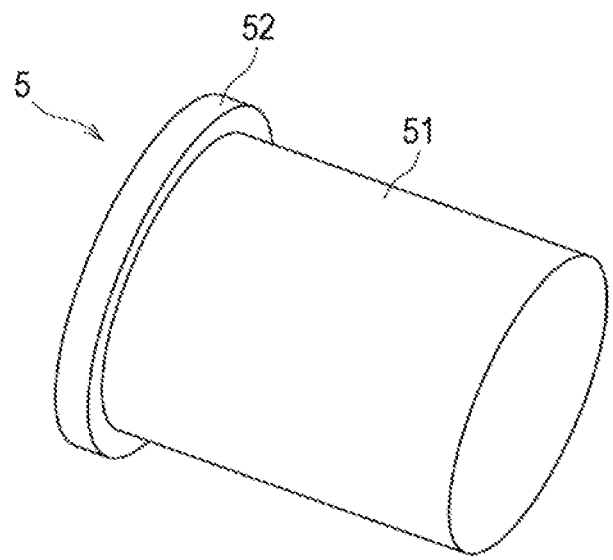
FIG. 5 is a perspective view illustrating a plug according to a modified example of the embodiment.
Figure 6:
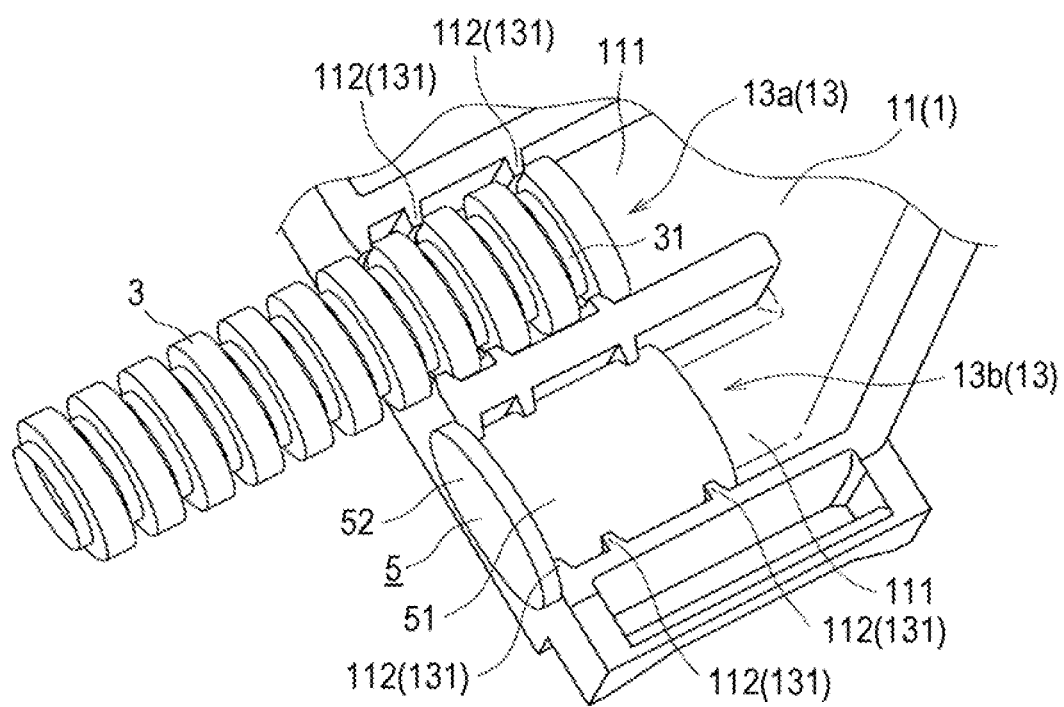
FIG. 6 is a perspective view illustrating a state where the plug in FIG. 5 is disposed in an insertion hole.

For example, in the foregoing embodiment, the groove portions 21a are provided in the plug 2, and the ribs 131 are fitted in the groove portions 21a. However, the configuration of a plug is not limited to this. For example, as in a plug 5 according to a modified example illustrated in FIG. 5 and FIG. 6, a body portion 51 need not be provided with groove portions. The plug 5 is made of an elastomer, such as rubber, and is configured to be elastically deformable. The diameter of the body portion 51 is greater than at least the inner diameter of each rib 131. Thus, when the body portion 51 is disposed in the second insertion hole 13b, the body portion 51 is compressed by at least the ribs 131, so that the body portion 51 is held by the ribs 131. The plug 5 may be installed in the following manners. For example, the cover 12 (refer to FIG. 1) may be assembled to the case body 11 with the plug 5 disposed in the case body 11. Alternatively, the plug 5 may be press-fitted into the second insertion hole 13b after the cover 12 is assembled to the case body 11. The diameter of the body portion 51 may be slightly greater than that of the second insertion hole 13b. In this case, the body portion 51 is compressed as a whole by the inner surface of the case 1, which defines the second insertion hole 13b. Further, a flange 52 is provided at one end of the body portion 51, and the flange 52 is disposed along the side surface of the case 1.

In the foregoing embodiment, the plug 2 includes the flange 22. However, the configuration of a plug is not limited to this. A plug that does not include a flange may be employed.

In the foregoing embodiment, the number of insertion holes 13 may be any number. For example, the case body 11 may be provided with only one insertion hole 13.

In the foregoing embodiment, the plug 2 may be made of a hard resin that is not elastically deformed or may be made of an elastically deformable material.

In the foregoing embodiment, the insertion hole 13 may have a circular cross-sectional shape or a rectangular cross-sectional shape.

In the foregoing embodiment, the diameter of the plug 2 may be adjusted by externally mounting a corrugated tube on the plug 2.

The disclosure is applicable to a protector for protecting a wiring harness to be routed in a vehicle.

What is claimed is:

1. A protector comprising:
a case configured to accommodate a wire harness, wherein
the case is provided with an insertion hole configured such that the wire harness is inserted through the insertion hole,
a rib is provided on an inner surface of the case, the inner surface defining the insertion hole, and the rib protruding inwardly from the inner surface, and
the rib is configured to:
be fitted in a groove portion provided in an outer peripheral surface of a corrugated tube that is externally mounted on the wire harness; and
contact and secure a plug that is configured to close the insertion hole.

2. The protector according to claim 1, wherein the rib is configured to:
be fitted in the groove portion provided in the outer peripheral surface of the corrugated tube when the wire harness is disposed in the insertion hole; and
hold the plug when the wire harness is not disposed in the insertion hole.

3. The protector according to claim 1, wherein the insertion hole is configured such that the wire harness extends from an inside of the case to an outside of the case.

4. The protector according to claim 1, further comprising the plug, wherein:
the plug has a body portion to be inserted through the insertion hole;
a groove portion is provided in an outer peripheral surface of the body portion; and
the rib is configured to be fitted in the groove portion of the body portion.

5. The protector according to claim 4, wherein the outer peripheral surface of the body portion has the same structure as the outer peripheral surface of the corrugated tube.

6. The protector according to claim 1, further comprising the plug, wherein:
the plug has a body portion to be inserted through the insertion hole; and
the body portion is configured to be elastically deformable.

7. The protector according to claim 1, wherein:
the case is provided with a plurality of the insertion holes;
each of the insertion holes is a first insertion hole in which the wire harness is disposed or a second insertion hole in which the wire harness is not disposed;
the rib in the first insertion hole is fitted in the groove portion provided in the outer peripheral surface of the corrugated tube; and
the second insertion hole is closed by the plug.

* * * * *